March 11, 1952     E. L. SWARTZ     2,589,160

RELAY TEST SET

Filed May 16, 1950

INVENTOR.
EDWARD L. SWARTZ

BY

ATTORNEY

Patented Mar. 11, 1952

2,589,160

UNITED STATES PATENT OFFICE 2,589,160

RELAY TEST SET

Edward L. Swartz, Princeton, Ill., assignor to Automatic Electric Laboratories, Inc., Chicago, Ill., a corporation of Delaware Application May 16, 1950, Serial No. 162,201

11 Claims. (Cl. 179—175)

The present invention relates to a device for testing the operating characteristics of relays with respect to time. It is particularly adapted for testing the release time of a slow-release relay.

In automatic telephone systems there is frequent use of relays which will hold operated during several quick energizing pulses but which will release if the interval between a series of quick pulses exceeds a predetermined time. The release period is usually of the order of 100 to 300 milliseconds. In some installations the release time of these slow-release relays is critical if proper operation of the system is to be maintained. For example, in a toll-ticketing system of the general type disclosed in Ostline Patent 2,366,647 there is a selector switch relay, sometimes referred to as the "C" relay, which must release in about 0.150 second±0.10 second. After a few months of operation the release time of these "C" relays is apt to exceed the tolerance limits with the result that calling parties are connected with wrong numbers.

In the past these slow-release relays have been tested with an intricate timing device costing many hundreds of dollars. It is, therefore, an object of this invention to provide a simple and inexpensive device which will test the characteristics of relays with respect to time.

Another object of the invention is to provide a test set which will not only allow an operator to make the standard tests customarily made by such sets but also to test the release time of slow-release relays.

A further object of the invention is to provide a relay testing device which utilizes most of the mechanical structure of a standard test set dial.

Further features of the invention pertain to the particular arrangement of the mechanical elements of the calling device whereby the above-outlined and additional features are attained.

Figure 1:
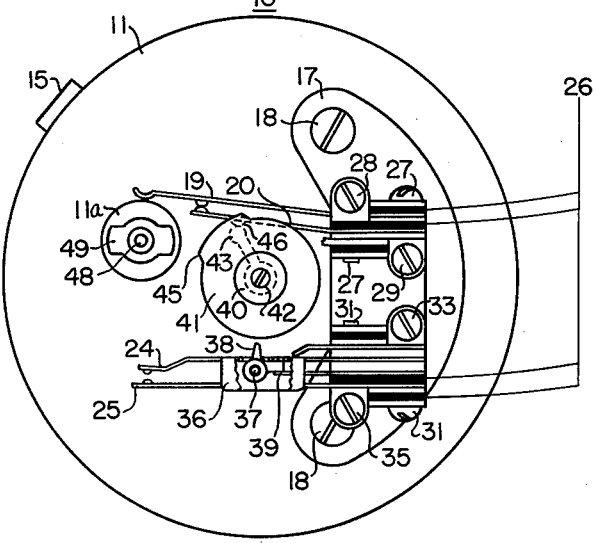
Figure 2:
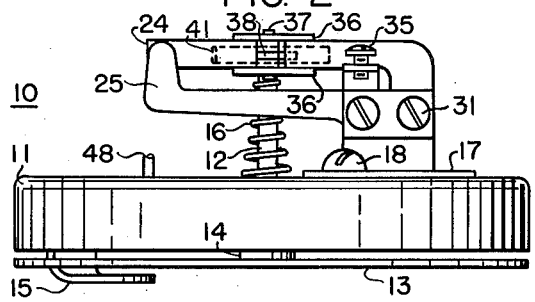
Figure 3:
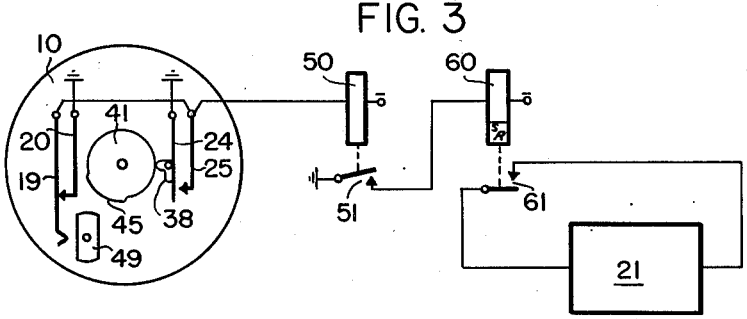

The novel features believed to be characteristic of the invention are set forth with particularity in the appended claims. The invention, both as to its organization and method of operation, together with further features will best be understood by referring to the following specification taken in connection with the accompanying drawing, in which Fig. 1 is a rear view of a calling device embodying the present invention; Fig. 2 is a side elevational view of the calling device shown in Fig. 1; and Fig. 3 illustrates diagrammatically a test circuit including the calling dial of Figs. 1 and 2.

It has been previously mentioned that the testing device which is the object of this invention may conveniently be incorporated in a standard test set. The dial of Figs. 1 and 2 may be an ordinary test set dial with certain structure added in accordance with this invention. For the sake of simplicity and clarity the portions of the dial having functions separate and apart from this invention have been omitted. Similarly, in Fig. 3 the operation of this invention has been illustrated by a schematic diagram in which the numerous switches and relays normally found in an automatic system have been indicated in block form.

Referring now more particularly to Figs. 1 and 2 of the drawing, there is shown a calling device 10 of the finger dial type and of the general construction and arrangement of that disclosed in U. S. Patent No. 1,642,822, Herbert F. Obergfell, granted September 20, 1927, which has been modified to embody the present invention.

The calling device 10 comprises a casing 11, a rotatable arbor 12, a finger wheel or dial 13 secured to an enlarged boss 14 provided on the outer end of the arbor 12, and a cooperating finger stop 15. The finger wheel 13 has ten spaced-apart openings therein, not shown, which are adapted to receive the finger of the user and which respectively correspond to the digits 1 to 0, inclusive. Also, a coil spring 16 is provided in surrounding relation with respect to the arbor 12, the inner end of the coil spring being secured to the casing 11 and the outer end thereof being secured to the outer end of the arbor 12. The rear wall of the casing 11 carries a bracket 17, the bracket being secured in place by two spaced-apart screws 18. The bracket 17 carries a set of impulse springs 19 and 20 and a set of cam springs 24 and 25.

The inner ends of the impulse springs 19 and 20 are suitably insulated from each other and from the bracket 17 by a plurality of strips of insulating material 26 and are retained in clamped position by two screws 27. Also, the impulse springs 19 and 20 are respectively provided with electrical terminals 28 and 29. Also, the inner ends of the cam springs 24 and 25 are suitably insulated from the bracket 17 by certain strips of insulating material 26 and are retained in clamped position by the two screws 31. The cam springs 24 and 25 are connected respectively to the electrical terminals 33 and 35. The terminals 29 and 33 may be electrically connected together as may the terminals 28 and 35 as shown in Fig. 3.

The cam spring 24 carries two spaced-apart and outwardly directed tabs 36 intermediate its ends which support a pivot pin 37 upon which a pawl 38 is pivotally mounted. The outer end of the pawl 38 is biased in a counter-clockwise direction about the pivot pin 37, as viewed in Fig. 1, by a leaf spring 39 extending under a projection on the pawl 38. The inner end of the leaf spring 39 is clamped to the bracket 17 by the screws 31. The arbor 12 carries a fixture 40 adjacent the outer end thereof and an annular insulating cam 41 on the extreme outer end thereof, the fixture 40 and the cam 41 being retained in place by a screw 42. The fixture 40 is provided with an outwardly extending impulse spring control arm 43 which serves to maintain contact between the impulse springs 19 and 20 when the dial is at rest. The peripheral edge of the cam 41 has a projection 45 which engages the pawl 38 during rotation of the cam 41. The impulse spring 20 carries an insulating control member 46 which cooperates with the control arm 43.

In addition, the calling device 10 comprises mechanism, not shown, housed in the casing 11, which includes a gear train and a connected impulse spindle 48 extending through an opening 11a provided in the rear wall of the casing 11. The outer end of the impulse spindle 48 carries an impulse cam 49 which cooperates with the extreme outer end of the impulse spring 19.

When the finger dial 13 occupies its normal position the arbor 12 is biased in a clockwise direction, as viewed in Fig. 1, by the coil spring 16 whereby the control arm 43 carried by the fixture 40 engages the control member 46 in order to urge the impulse springs 19 and 20 into engagement. The projection 45 carried by the cam 41 is disposed forwardly in a clockwise direction with respect to the outer end of the pawl 38. The pawl 38 is biased in a counter-clockwise direction about the pivot pin 37 by the leaf spring 39.

In order to operate the calling device 10, the user inserts his finger into one of the holes provided in the finger wheel 13 corresponding to the digit to be transmitted and rotates the finger wheel 13 in a counter-clockwise direction, as viewed in Fig. 1, until his finger engages the finger stop 15 and then releases the finger wheel 13. When the finger wheel 13 and the arbor 12 secured thereto are rotated in a counter-clockwise direction, the coil spring 16 is wound and the mechanism housed in the casing 11 is set to transmit impulses corresponding to the digit thus registered. More particularly, when the arbor 12 is rotated in a counter-clockwise direction the control arm 43 carried by the fixture 40 disengages the control member 46, thereby allowing the impulse springs 19 and 20 to move, while maintaining engagement therebetween, toward and into cooperating relationship with respect to the impulse cam 49; however, the impulse spindle 48 and the impulse cam 49 carried thereby are not rotated prior to the release of the finger wheel. As the arbor 12 is rotated in the counter-clockwise direction, the projection 45 carried on the periphery of the cam 41 rides over the outer end of the pawl 38 and therebehind. When the projection 45 engages the outer end of the pawl 38, the pawl 38 is pivoted about the pivot pin 37 in a clockwise direction, as viewed in Fig. 1, against the bias of the leaf spring 39; however, the cam spring 24 is not moved into engagement with the cam spring 25 due to this action of the pawl 38.

When the projection 45 rides over the outer end of the pawl 38 and therebehind, the leaf spring 39 pivots at pawl 38 in the counter-clockwise direction about the pivot pin 37 back into its normal position, without moving the cam spring 24 into engagement with cam spring 25.

At this time, when the finger wheel 13 is released it is returned in the clockwise direction, as viewed in Fig. 1, by the coil spring 16 back into its normal position, during which movement the mechanism housed in the casing 11 rotates the impulse spindle 48 an appropriate amount corresponding to the digit registered. At this time, the outer end of the impulse spring 19 is arranged in cooperating relationship with respect to the impulse cam 49 due to the disengagement between the control arm 43 carried by the fixture 40 and the control member 46 carried by the impulse spring 20; accordingly, each time an end of the cam 49 engages the outer end of the impulse spring 19 the impulse spring 19 is moved out of engagement with the impulse spring 20. Hence, the opposite ends of the impulse cam 49 alternately engage and disengage the outer end of the impulse spring 19, thereby alternately to move the impulse spring 19 into disengagement and to permit it to be returned into engagement with the impulse spring 20, whereby the calling device 10 transmits a number of impulses by way of the impulse springs 19 and 20 corresponding to the digit registered.

Also, when the finger wheel 13 is released the cam 41 carried on the outer end of the arbor 12 is rotated in a clockwise direction, as viewed in Fig. 1, whereby the projection 45 carried on the periphery of the cam 41 engages the outer end of the pawl 38. A projection on the pawl 38 pivots during its rotation in the counter-clockwise direction about the pivot pin 37. Accordingly, at this time the pawl 38 is forced outwardly and downwardly away from the engaged projection 45 carried on the periphery of the cam 41 in order to force the cam spring 24 into engagement with the cam spring 25. Subsequently, when the projection 45 carried on the periphery of the cam 41 rides over the outer end of the pawl 38, the pawl 38 and the cam spring 24 are returned to their normal positions due to the inherent resiliency of the cam spring 24, whereby the cam spring 24 is moved into disengagement with the cam spring 25.

A dial in proper operating condition sends out pulses at a constant rate. The rate may readily be adjusted by adjusting a governor mechanism (not shown). A dial adjusted to 14 pulses per second sends a pulse every 0.071 second. This invention utilizes this fact to test the release time of a relay in the manner shown in Fig. 3

In Fig. 3 the dial 10 is shown controlling the energizing circuit of a fast relay 50. When the dial 10 is in normal position a circuit is completed from ground through impulse springs 20 and 19 for the operation of relay 50. Accordingly, contacts 51 are normally open.

When a digit pulse is sent out by movement of the finger wheel of the dial 10, relay 50 is released and its contacts 51 close to complete an operating circuit for a slow-release relay 60. The relay 60 shown is comparable to the "C" relay normally present in selector switches and its contacts must open within a certain critical time interval in order for the telephone system, represented in block form at 21, to function properly. In Fig. 3 relay 60 is being tested to determine that it will release and open its contacts 61 within approximately 0.142 second.

To accomplish this the cam springs 24 and 25 are connected as shown so as to provide alternative ground for the operation of relay 50 and the projection 45 on the cam 41 is given sufficient peripheral length to close the impulse springs 24 and 25 for two pulses of the impulse springs 19 and 20. The cam 41 may conveniently be set to close contact between the impulse springs 24 and 25 during the time the fifth and sixth pulses would normally be sent out by springs 19 and 20. By adjusting the dial to about 14 pulses per second and then dialing a digit between 7 and 0 the cam springs 24 and 25 will ground out two of the pulses otherwise sent out by cam springs 19 and 20. Relay 50 will then be held operated for approximately 0.142 second. If the release period of relay 60 is too long it will hold operated after the impulse springs 24 and 25 have broken contact. If the relay 60 has the proper release period it will release and open its contacts 61 during the time that the impulse springs 24 and 25 have furnished ground for the operation of relay 50.

It is readily apparent that the speed of rotation of the dial could be changed by any desired adjustment of the governor. It is also readily apparent that the peripheral length of the projection 45 could be changed so as to have the impulse springs 24 and 25 supply ground for the operation of relay 50 for one pulse or for three or more. Consequently, suitable adjustment of the dial speed as well as adjustment of the peripheral length of the projection 45 may be utilized to test the release time of slow-release relays of any particular release period. Slow-to-operate relays may also be tested by this device.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In a device for testing the time of operation of a relay, a setting member having a normal position and being variably operable away therefrom to a plurality of other positions, means for returning said setting member back to its normal position after it has been operated, a set of impulse springs controlling an energizing circuit of said relay and operated only during the return of said setting member a variable number of times depending upon the extent of the operation of said setting member to make and break the energizing circuit of said relay, a second set of springs operated for a fixed interval of time during the return of said setting member, and a circuit connecting said sets of springs, said second set of springs rendering ineffective during said fixed interval of time the operation of said set of impulse springs causing said relay to be tested by maintaining its circuit in one condition for said fixed interval of time.

2. In a device for testing relays with respect to time, a setting member having a normal position and being variably operable away therefrom to a plurality of other positions, means for returning said setting member back to its normal position after it has been operated, a first set of impulse springs controlling the energizing circuit of one of such relays and operated during the return of said setting member a variable number of times depending upon the extent of the operation of said setting member to make and break the energizing circuit of said relay, a cam rotated by said setting member during the return of said setting member, and a set of shunt springs operated by said cam for shunting said impulse springs for a fixed interval of time during the return of said setting member irrespective of the extent of the operation of said setting member, causing a test of the time of operation of said relay by maintaining its circuit in one condition for said fixed interval of time.

3. In a test set for testing the time of operation of a relay, a setting member having a normal position and being variably operable away therefrom, means for returning said setting member back to its normal position after it has been operated, a set of impulse springs controlling the operation of said relay and operated intermittently by said setting member during the complete return of said setting member whereby a variable number of impulses is sent by said set of impulse springs depending upon the extent of the operation of said setting member to operate said relay, and a set of shunt springs operated by said setting member during only the last portion of the return of said setting member whereby a shunt of controlled time duration is applied by said set of shunt springs across said impulse springs regardless of the extent of the operation of said setting member, said shunt of controlled time duration causing a test of the time of operation of said relay by maintaining said relay in one condition for the time said shunt is applied.

4. In a test set for testing the time of operation of a relay, a setting member having a normal position and being variably operable away therefrom, means for returning said setting member back to its normal position after it has been operated, a first and second set of contacts, and means actuated only during the return of said setting member for operating said first set of contacts a variable number of times depending upon the extent of the operation of said setting member to send impulses to operate said relay and for operating said second set of contacts to shunt said first set of contacts for a certain time interval regardless of the extent of the operation of said setting member, causing a test of the time of operation of said relay by maintaining said relay in one operated position for said certain time interval.

5. In a test set, for testing the time of operation of a relay having an energizing circuit, a setting member having a normal position and being variably operable away therefrom, means for returning said setting member back to its normal position after it has been operated, first and second pairs of contacts, a first cam actuated by said setting member only during the return of said setting member for opening said first pair of contacts a variable number of times depending upon the extent of the operation of said setting member, circuit means controlled by the opening of said first set of contacts to in turn control the energizing circuit of said relay, a second cam rotatable by said setting member during the operation of said setting member for closing said second pair of contacts for a controlled time interval during the return of said setting member, and a circuit connecting said first and second pairs of impulse contacts whereby the closing of said second pair of contacts renders ineffective certain of the operation of said first pair of contacts, causing a test of the time of operation of said relay by maintaining said energizing circuit in one state for said controlled time interval.

6. In a test set for testing the time of operation of a relay having an energizing circuit, a dial having a normal position and being variably rotatable away therefrom to a plurality of other positions, an arbor operatively connected to said dial, a member carried by said arbor, means for returning said dial back to its normal position after it has been rotated, a set of impulse springs controlling the energizing circuit of said relay and operated from said arbor only during the return of said dial to break the energizing circuit for said relay a variable number of times depending upon the extent of the rotation of said dial, and a set of shunt springs operated directly by said member to shunt the set of impulse springs for a particular time interval during the return of said dial regardless of the extent to which said dial has been rotated, causing a test of the time of operation of said relay by maintaining said relay in one condition for said particular time interval.

7. In a test set for testing the time of release of a relay having an energizing circuit, a dial having a normal position and being variably rotatable away therefrom, an arbor connected to said dial, means for returning said dial back to its normal position after it has been rotated, a first cam rotated by said arbor only during the return of said dial a variable number of times depending upon the extent of the rotation of said dial, means for controlling said energizing circuit for said relay comprising a fast operating relay, a first set of springs connected to said fast operating relay and operated by said first cam to operate said fast operating relay which in turn causes operations of said relay under test, a second cam connected on said arbor and rotated thereby, and a second set of springs operated by said second cam for a certain time interval during the return of said dial to prevent operation of said fast operating relay for said certain time interval regardless of the extent of the rotation of said dial, causing a test of said relay under test by maintaining its energizing circuit open for said certain time interval.

8. In a testing device, a fast acting relay, an impulse sender for intermittently operating said relay at a predetermined rate of speed, a slow acting relay, a circuit for said slow relay intermittently opened by the operation of said first relay, and means associated with said sender for automatically preventing a predetermined number of the operations of said first relay during operation of said sender to maintain the circuit of said slow relay open for a predetermined time in accordance with the number of operations of the first relay which are prevented, to thereby time the release time of the slow relay.

9. A testing arrangement for testing the operation of a quick and slow relay combination where the slow relay is desired to remain operated during intermittent operations of the quick relay, said arrangement comprising an impulse sender having contacts connected in circuit with the quick relay and operated to cause intermittent operations thereof, said sender having a set of shunt springs operated during the movement of the sender to shunt said contacts for a predetermined time during operation of the sender to test the release time of said slow relay.

10. In a testing arrangement for testing the time of operation of relays, a telephone dial connected to control the circuit of one of such relays, said dial comprising an impulse sender sending impulses to the relay when the dial is operated and means associated with said sender for shunting out selected ones of said impulses, the shunting out of said selected impulses of said impulse sender causing said relay to be tested by maintaining its circuit in one condition for a predetermined time interval.

11. For use with a telephone system having a slow release relay, a device for testing the time of release of the slow release relay comprising a dial and connecting means so that operation of said dial controls the operation of said slow release relay, said dial having a setting member having a normal position and being variably operable therefrom to a plurality of other positions, means for returning said setting member back to its normal position after it has been operated, a first set of impulse springs operated only during the return of said setting member a variable number of times depending upon the extent of the operation of said setting member, a second set of springs operated for a fixed interval of time during the return of said setting member, and a circuit connecting said sets of springs whereby the operation of said first set is of no effect during the time interval in which said second set of impulse springs are operated, so that when said first set of impulse springs operates said slow release relay is operated, and when said second set of impulse springs are operated to make the operation of said first set of impulse springs ineffective the time of release of said slow release relay is tested.

EDWARD L. SWARTZ.

REFERENCES CITED

The following references are of record in the file of this patent:

UNITED STATES PATENTS

| Number | Name | Date |
| --- | --- | --- |
| 2,043,674 | Obergfell | June 9, 1936 |
| 2,366,647 | Ostline | Jan. 2, 1945 |
| 2,432,092 | Ferrele | Dec. 9, 1947 |
| 2,496,622 | Dunbar | Feb. 7, 1950 |